Figure 5:
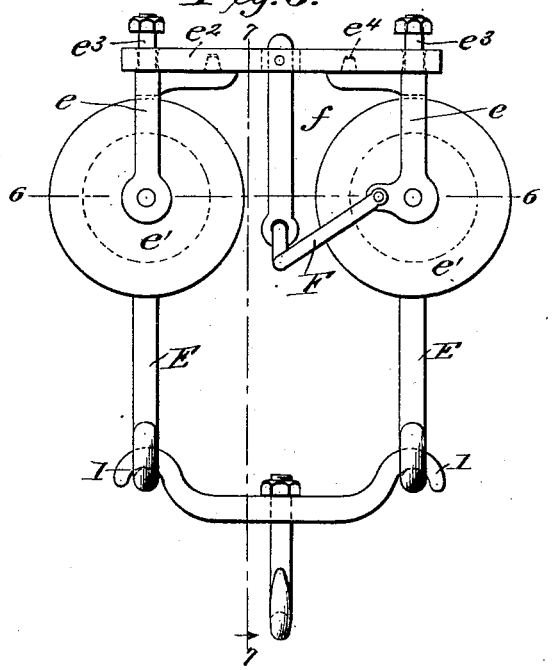

(No Model.) 5 Sheets—Sheet 1.
S. D. ROOT & G. C. VINEYARD.
CABLE RAILWAY.
No. 480,519. Patented Aug. 9, 1892.
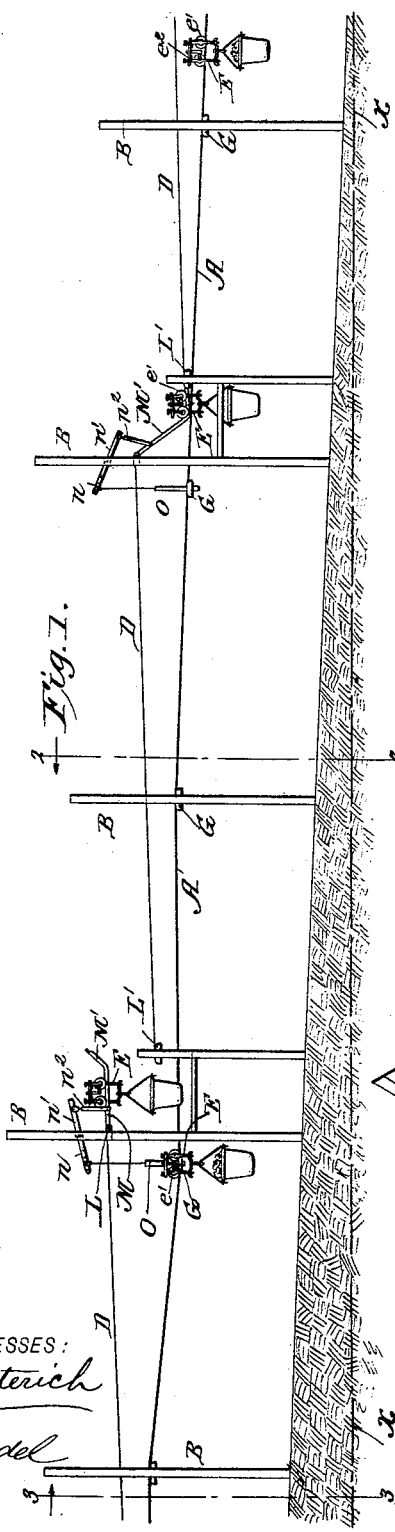
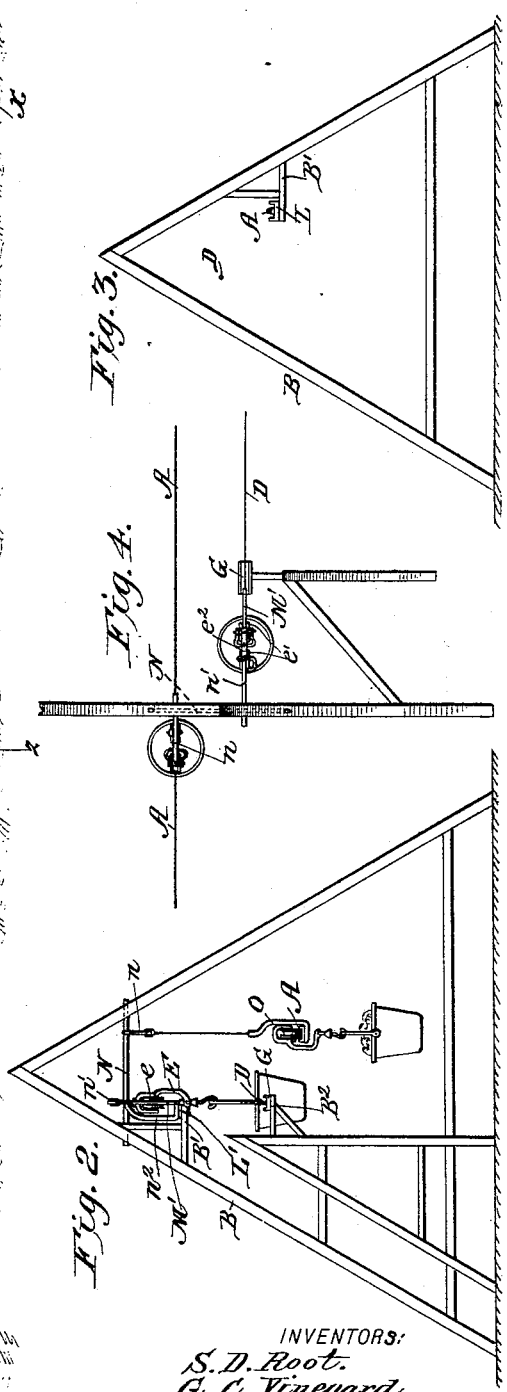
WITNESSES:
Fred G. Dieterich
W. D. Blondel
INVENTORS:
S. D. Root.
G. C. Vineyard.
BY Munn & Co.
ATTORNEYS (No Model.) 5 Sheets—Sheet 2.

S. D. ROOT & G. C. VINEYARD.
CABLE RAILWAY.

No. 480,519. Patented Aug. 9, 1892.

WITNESSES:
Fred G. Dieterich
M. D. Blondel

INVENTORS:
S. D. Root.
G. C. Vineyard,
BY Munn & Co
ATTORNEYS (No Model.) 5 Sheets—Sheet 3.
S. D. ROOT & G. C. VINEYARD.
CABLE RAILWAY.
No. 480,519. Patented Aug. 9, 1892.
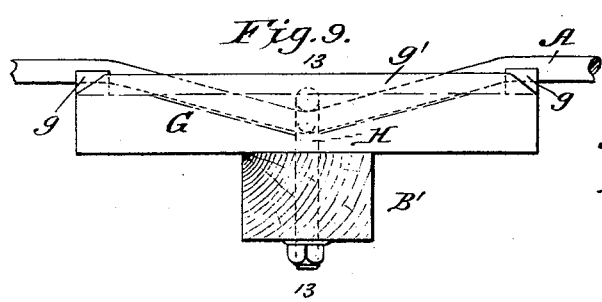
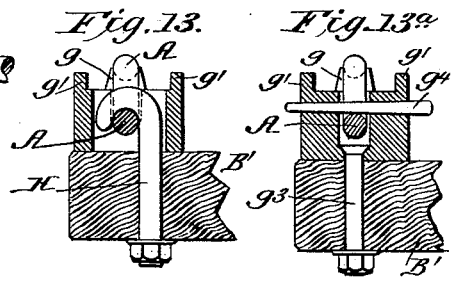
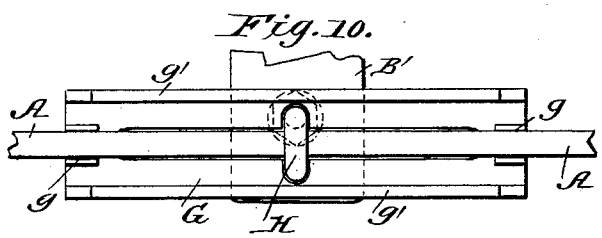
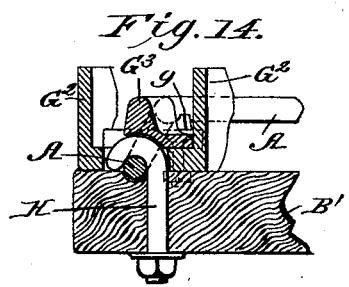
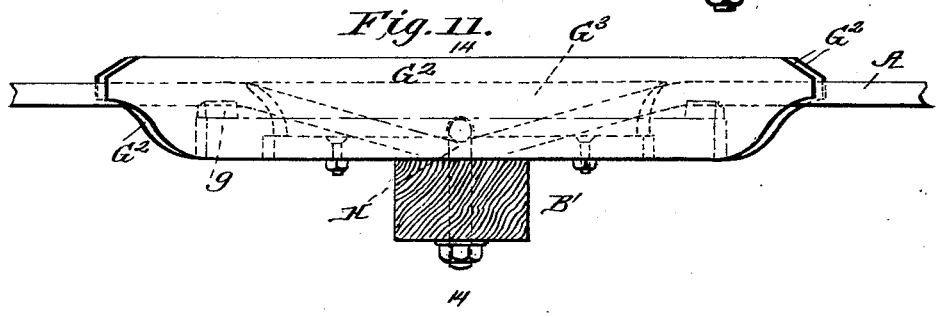
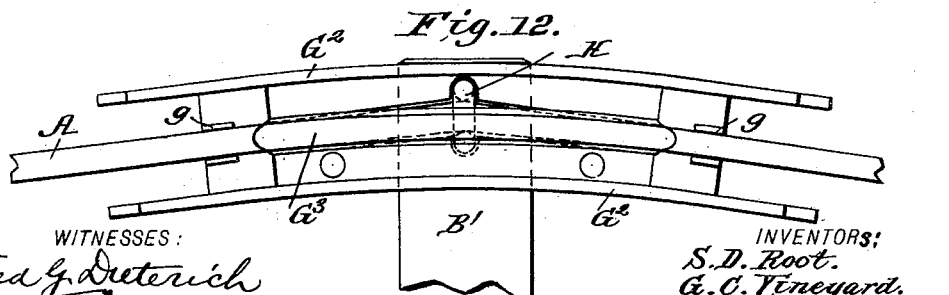
WITNESSES:
Fred G. Dieterich
M. D. Blondel
INVENTORS:
S. D. Root.
G. C. Vineyard.
BY Munn & Co
ATTORNEYS (No Model.) 5 Sheets—Sheet 4.
S. D. ROOT & G. C. VINEYARD.
CABLE RAILWAY.
No. 480,519. Patented Aug. 9, 1892.
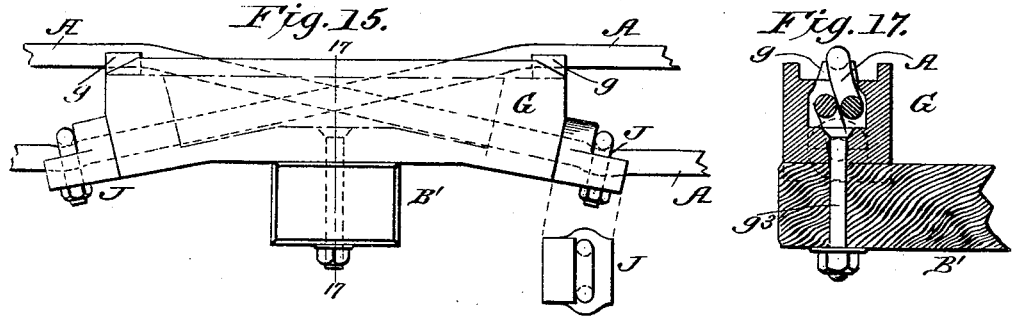
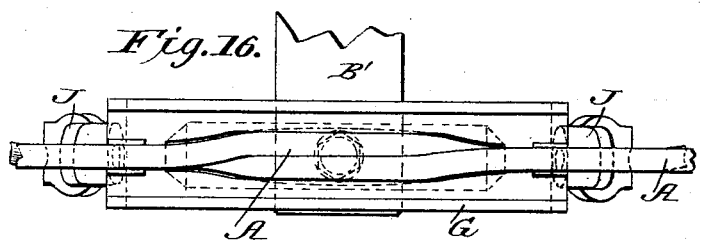
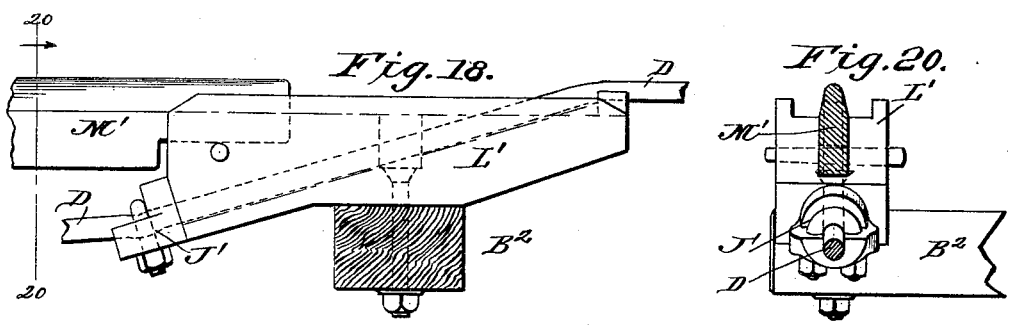
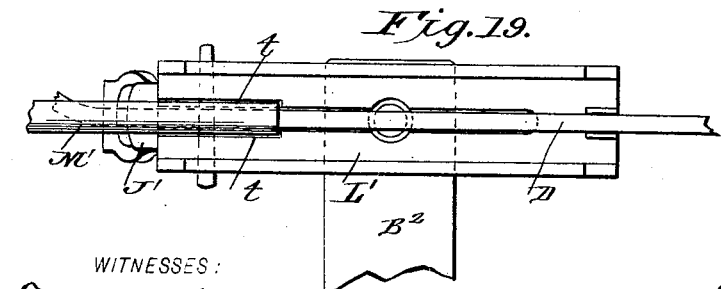
WITNESSES:
Fred G. Dieterich
M. D. Blondel
INVENTORS:
S. D. Root.
G. C. Vineyard.
BY Munn & Co
ATTORNEYS (No Model.) 5 Sheets—Sheet 5.

S. D. ROOT & G. C. VINEYARD.
CABLE RAILWAY.

No. 480,519. Patented Aug. 9, 1892.

WITNESSES:
Fred G. Dieterich
W. D. Blondel

INVENTORS:
S. D. Root.
G. C. Vineyard.
BY Munn & Co
ATTORNEYS

UNITED STATES PATENT OFFICE.

SAMUEL D. ROOT AND GORDON C. VINEYARD, OF ANACONDA, MONTANA.

CABLE RAILWAY.

SPECIFICATION forming part of Letters Patent No. 480,519, dated August 9, 1892.

Application filed March 2, 1892. Serial No. 423,554. (No model.)

*To all whom it may concern:*

Be it known that we, SAMUEL D. ROOT and GORDON C. VINEYARD, residing at Anaconda, in the county of Deer Lodge and State of Montana, have invented certain new and useful Improvements in Cable Railways, of which the following is a specification.

The object of our invention is to provide a freight-line that is simple in construction, inexpensive in keeping in repair, and automatic in its operation, and which is more especially adapted for use in hilly or mountainous countries where there is a natural grade and where it is desired to carry ore, wood, coal, &c., down to a lower place in the valley.

One of the important features of our invention is to have a stationary cable upon which a small car is held to travel downgrade, from which is suspended the load intended to be carried down the hill.

Another and most important feature of our invention, however, is to return the empty cars automatically up the grade to their original starting-point on another but smaller stationary cable inclined in a reverse direction to the main cable.

To these ends our invention consists in combining with a main or continuous stationary cable inclined in the direction of the grade a second cable formed in sections, each section inclined in reverse directions to the main cable, and mechanism intermediate the continuous and sectional cables, which are automatically set in operation by the movement of the weighted car to successively carry the empty car to engage the reverse cables, whereby it is carried up the hill to its point of starting.

Our invention further consists in the peculiar combination and novel arrangement of parts, all of which will hereinafter be fully described in the annexed specification, and particularly pointed out in the claims, reference being had to the accompanying drawings, in which—

Figure 7:
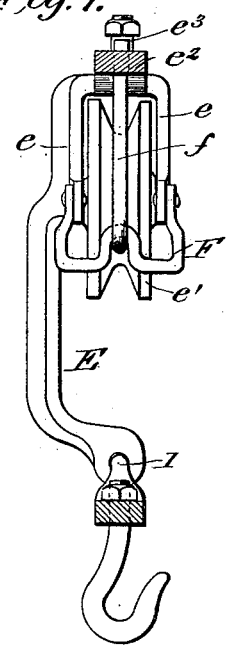
Figure 6:
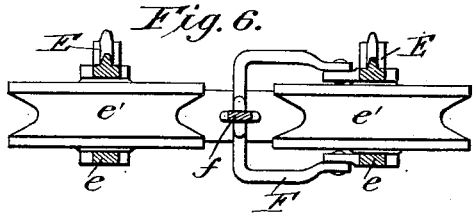
Figure 8:
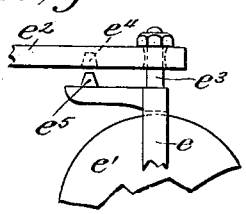
Figure 21:
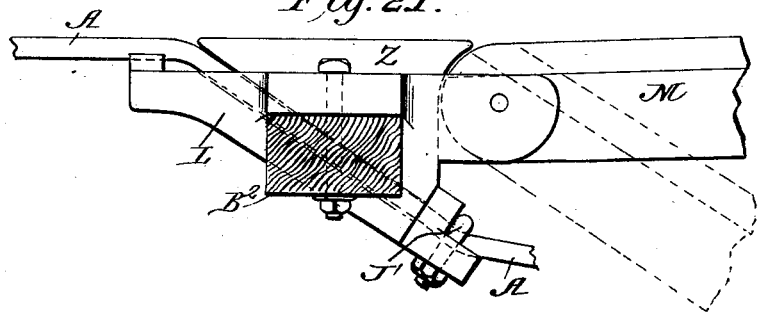
Figure 22:
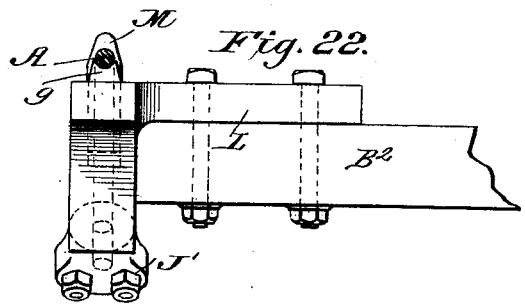
Figure 23:
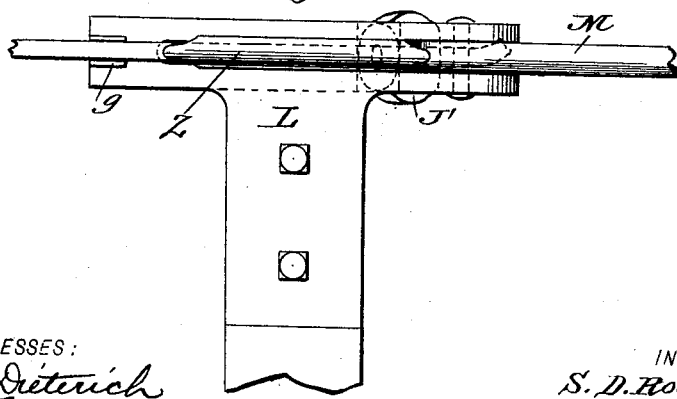

Figure 1 is a side elevation of our improved cable-railway. Fig. 2 is a transverse section taken on the line 2 2, Fig. 1, looking in the direction indicated by the arrow. Fig. 3 is a transverse section on the line 3 3, Fig. 2, the bucket-supporting appliances and the buckets being omitted. Fig. 4 is a top plan view of a portion of the cables, the frame, the levers, cars, &c. Fig. 5 is a side elevation of one of the transporting-cars. Fig. 6 is a horizontal section of the same on the line 6 6, Fig. 5. Fig. 7 is a vertical transverse section on the line 7 7 of Fig. 5. Fig. 8 is a detail view of the car, hereinafter especially referred to. Figs. 9 and 10 are respectively a side and a plan view of one of the straight shoes for holding the cables to the frame. Figs. 11 and 12 are similar views illustrating one of the curved shoes. Fig. 13 is a cross-section taken on the line 13 13, Fig. 9. Fig. 13$^a$ is a similar view of a modification of the fastening shown in Fig. 13. Fig. 14 is a cross-section taken on the line 14 14, Fig. 11. Figs. 15 and 16 are side and top views, respectively, of one of the shoes, to which the meeting ends of the cable are secured. Fig. 17 is a detail cross-section of the same on the line 17 17, Fig. 15. Figs. 18 and 19 are side and top views, respectively, of one of the shoes disposed at the lower ends of the return cable-sections, the adjacent end of the lifting-arm, hereinafter referred to, being shown in its lower position in engagement with such shoe. Fig. 20 is a cross-section taken on the line 20 20, Fig. 18. Figs. 21, 22, and 23 are detail views, hereinafter specifically referred to.

Referring to the accompanying drawings, A indicates the main cable, which is arranged parallel, or nearly so, with the natural grade, which is indicated by the line X in Fig. 1, upon which are placed the cars which carry the load down the hill. This cable is fixedly held on suitably-constructed strut-frames B B and the adjacent ends of the several sections joined by the peculiarly-constructed shoes, hereinafter fully described.

It should be stated that at one end tension devices (not shown) of any ordinary construction are employed to apply a proper tension to the cable, such tension being, however, of such a nature that as the loaded car passes down it will serve to sag the cable to a limited degree for a purpose presently explained.

Above the main cable and to one side thereof is arranged the return-cable, which is of a smaller diameter, and consists of a series of cable-sections D, arranged on a reverse grade. It will be observed by reference to Fig. 1 that the lower end of each cable-section D is at a point below the upper end of the next succeeding section D, and between such ends are disposed lifting devices, which are automatically operated by the loaded car (in the manner hereinafter more fully described) to elevate the empty car after it reaches the lower end of one cable-section D to the upper end of the next section, the number of such sections depending upon the grade and the length of the line.

The cars which support the buckets or other device for holding the load, and which are most clearly illustrated on Sheet 2 of the drawings, each consist of a pair of vertical arms E E, the upper ends of which are formed into yoke portions $e$, in which are journaled the carrier-wheels $e'$ $e'$, which are held in alignment as they travel on a straight portion of the cable by means of a cross-bar $e^2$, which has a limited vertical play on the yoke-journals $e^3$, and which is provided on its under face with sockets $e^4$, which fit upon pins $e^5$, projected up from lateral extensions on the yoke-frames, as shown.

To the lower end of one of the yoke-frames $e$ is pivoted a clevis-shaped lifting device F, which extends out between the wheels $e'$ $e'$, to the outer end of which is pivotally connected the lower end of the lifting-bar $f$, the upper end of which is pivotally connected to the cross-bar $e^2$, as shown. It will be seen by reference to Fig. 7 that the clevis extends laterally to each side of the wheel $e'$, such extensions being adapted, when the car passes onto any one of the curved shoes, to engage vertical projecting flanges on such shoes, which elevates the clevis member and causes its lifting-arm to raise the cross-bar $e^2$ so it will become disengaged from the lock-pins. By this construction it will be observed that while the carrier-wheels will be firmly held in line when traveling on a straight portion of the cable A such wheels will become disconnected and each act independent of the other as they pass around a curve, and as the upper end of each yoke-frame has a journal member and the lower end of the frame a hole large enough for the hooks $l$ $l$ to have free play therein each wheel is thus allowed to adjust itself to the curve required.

The main cable and supplemental cables are held to the strut-frames B by means of peculiarly-constructed shoes, and such cables are arranged in the manner most clearly shown in Figs. 2 and 3, so as to allow the full and empty cars to pass each other freely without the danger of interfering.

The cable-holding shoes (illustrated in detail on Sheet 3 of the drawings) consist of the straight shoes shown in Figs. 9, 10, and 13 and the curved shoes shown in Figs. 11, 12, and 14, and each of the straight shoes is formed of a longitudinally-slotted member G, (held on the timber B',) in the ends of which seat portions $g$ are formed, in which the cable A seats. Centrally of these seats the cable is kinked and held taut by the hook-bolt H, which draws it down, keeps it from slipping, and securely holds it fast on the shoe. (See Fig. 13.) The bottom of the shoe is of a proper height for the flanges of the wheels $e^2$ to run upon, so that the bottom of the groove of the wheel is kept in line with the top of the cable, side guides $g'$ being provided, which serve to hold the wheel to the position stated. Instead of the hook-bolt H the shoe may be held on the frame by the countersunk bolt $g^3$ and the cable held kinked by the transverse key or pin $g^4$, as clearly shown in Fig. 13$^a$.

The curved shoe shown in Figs. 11, 12, and 14 has its longitudinal slot arranged angularly, as shown, into which the cable enters, and is held in the same manner as it is held to the straight shoe. The curved side walls are, however, projected up to form lifting-cams G$^2$, which engage and lift the clevis members as the car passes by them, central curved guide-rails G$^3$ being provided, on which the grooved carrier-wheels run, which rail serves to hold the car-wheels to their proper position to guide them onto the cable.

In places where the cable is to be cut or where the cable breaks the ends are secured together by a shoe constructed as shown in Figs. 15, 16, and 17. In this case the ends of the cable are passed in opposite directions through the shoe and bent diagonally downward, the ends being secured in clamp-washers J J, as shown.

The reverse-cables D are secured at their upper ends in shoes L, secured to laterally-projecting timbers B$^2$, over the inner ends of which pass the upper ends of the cables D, which then extend diagonally downward through the shoes and are secured by the clamp-nuts J'. To the outer end of each of these shoes are hinged the swinging-arms M, which normally project diagonally rearward and downward, and are formed with horizontally-disposed extensions M', which seat in grooves $t$ in the shoes L', to which the lower end of the cable-section D is connected, in the manner clearly understood by reference to Figs. 18, 19, and 20. In the upper shoes L L, between the hinged end of the swinging arms M and the cable end of the shoe, are fixedly held narrow pieces Z Z, which serve to make a continuous track from the hinge portion to the cable. (See Fig. 21.) The frame-timbers B B, to which the upper shoes L are attached, are each extended up and form bearings for rock-shafts N, which are formed with oppositely-projecting lever-arms $n$ $n'$, the outer ones $n'$ of which have a pivoted pitman-rod $n^2$, which connects with the lifting arm M, (see Fig. 1,) while the inner arms $n$ are connected to arms O, projected up from the shoes G$^x$, as shown, such shoes being of a construction similar to the shoes G, one of such rock-shafts, levers, and their connections with the main cable being provided at the meeting ends of the reversible sections.

The manner in which our improved railway operates is as follows: The loaded car after it is placed upon the main cable at the upper end passes down such cable, (the speed depending upon the grade and tension of the cable,) and when it reaches its destination it is unloaded and placed upon the lower one of the reverse-cable sections, on which it runs in a reverse direction until it reaches the lower end of such section, where it rests upon one of the lifting arms M, before referred to. As the next loaded car passes down the main cable and as it reaches a point in advance of the empty car, its weight causes the cable to say at such point, which draws the arm O downward, rocks the adjacent rock-shaft N, swings the arm M upward, and lifts the empty car up onto the upper end of the next cable-section D, on which it then runs in a reverse direction until it reaches the next arm M, where it again rests until the next succeeding loaded car again operates to raise it in the same manner as the preceding loaded car raised it. It will thus be seen that simple and effective and automatic means are provided to return the empty cars up the hill as far as desired or as far as the natural grade extends.

Having thus described our invention, what we claim, and desire to secure by Letters Patent, is—

1. A cable railway comprising a main downgrade cable, a series of supplemental downgrade-cable sections inclined in a reverse direction to the main cable, lifting mechanism connecting the lower end of one section of the supplemental cables with the upper end of the next succeeding supplemental cable-section, and means for operating such lifting mechanism, substantially as shown and described.

2. A cable railway comprising a main stationary downgrade cable, a series of supplemental downgrade-cable sections, each inclined in a reverse direction to the main cable, lifting mechanism connecting the lower end of one reverse-cable section with the upper end of the next succeeding reverse-cable section, and connections between such lifting mechanism and the main cable, whereby when the main cable is sagged at such connection points it will operate to lift the said mechanism, substantially as and for the purposes described.

3. In a cable railway, the combination, with the supporting-frames and the main stationary downgrade cable, of a series of downgrade cables disposed above and to one side of the main cable, said sections being inclined in a reverse direction to the main cable and adapted to receive the empty cars, and means operated by the passage of the loaded cars on the main cable for elevating the empty cars from one reverse-cable section to the next succeeding section, whereby such car will be carried up the grade, substantially in the manner and for the purpose described.

4. The combination, with the supporting-frame, the main and the reverse downgrade cables arranged relatively to each other, as shown, and held stationary on the supporting-frame, of the lifting mechanism consisting of a swinging arm hinged to the upper end of one reverse section and formed with a seat portion normally in engagement with the lower end of the preceding section, the rock-shaft N, having oppositely-projecting lever-arms n n', connected, respectively, with the main cable and the swinging arm, all arranged substantially as shown, and for the purposes described.

5. In a cable railway of the kind described, the combination, with the supporting-frame timber B' and the cable A, of the shoe G, having side guides and a longitudinal slot, and means for drawing the cable into the slot and securing it to the shoe and the shoe to the timber B', substantially as shown and described.

6. In a cable railway of the kind described, the combination, with the supporting-frames and the cables, of a cable-holding shoe having side guides, a longitudinal slot adapted to receive the depressed portion of the cable, and a central curved guide member forming a track-rail, and the nutted hook-bolt for holding the cable down into the slot of the shoe and the shoe to the frame, substantially as and for the purpose described.

7. In a cable railway of the kind described, the combination, with the supporting-frame, the cable, and a curved cable-holding shoe having side guides projecting vertically, forming cam projections, of a car having two carrier-wheels independently journaled, mechanism for locking such wheels normally in a fixed alignment, and unlocking devices mounted on the car adapted to engage the cams on the curved shoe and operated thereby to unlock the said locking mechanism, whereby the wheels will be capable of independent adjustment as they engage the curved shoe, substantially as and for the purpose described.

8. In a cable railway of the kind described, the combination, with the supporting-frame and the cable formed of two sections, of a cable-holding shoe having oppositely and downwardly-slotted portions to receive the opposite ends of the cables, and the clamp-nuts J, secured to the outer projected ends of such cables, substantially as and for the purposes described.

9. The combination, with the cable-sections D and the swinging arm, having a seat member at its lower end and hinged at its upper end to one of the sections D, of a cable-holding shoe secured to the lower end of the preceding cable-section, said shoe formed with a socket portion to receive the seat portion of the swinging arm, substantially as shown and described.

10. The combination of the supporting-frame, the cable-section D, the cable-shoe L, slotted diagonally downward and rearward, said slot adapted to secure the upper end of the cable-section D, the clamp J' for holding such section to the shoe L, the lifting-arm M, hinged in the rear end of such shoe, and the rail-section Z, disposed between the hinged end of the shoe and the cable-receiving end thereof, substantially as and for the purpose described.

SAMUEL D. ROOT.
GORDON C. VINEYARD.

Witnesses:
HENRY S. NEAL,
THOMAS B. MALLORY.